US008817662B2

(12) United States Patent
Mahaffy et al.

(10) Patent No.: US 8,817,662 B2
(45) Date of Patent: Aug. 26, 2014

(54) PRE-ASSOCIATION DISCOVERY (75) Inventors: Brian Mahaffy, Boise, ID (US); DeVerl Stokes, Eagle, ID (US); Ray Asbury, Eagle, ID (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/249,740

(22) Filed: Sep. 30, 2011

(65) Prior Publication Data
US 2012/0099476 A1    Apr. 26, 2012

Related U.S. Application Data (60) Provisional application No. 61/405,052, filed on Oct. 20, 2010.

(51) Int. Cl.
*H04L 12/28* (2006.01)
*H04W 4/00* (2009.01)

(52) U.S. Cl.
USPC .......................................... 370/254; 370/338

(58) Field of Classification Search
USPC ................................. 370/254, 338
See application file for complete search history.

(56) References Cited

U.S. PATENT DOCUMENTS

| 4,337,463 | A  | 6/1982  | Vangen           |
| 5,673,291 | A  | 9/1997  | Dent             |
| 6,320,919 | B1 | 11/2001 | Khayrallah et al.|
| 6,816,452 | B1 | 11/2004 | Maehata          |
| 7,239,882 | B1 | 7/2007  | Cook             |
| 7,342,895 | B2 | 3/2008  | Serpa et al.     |
| 7,564,826 | B2 | 7/2009  | Sherman et al.   |
| 7,580,397 | B2 | 8/2009  | Arai et al.      |
| 7,595,768 | B2 | 9/2009  | Li et al.        |
| 7,599,671 | B2 | 10/2009 | Kopikare et al.  |
| 7,626,966 | B1 | 12/2009 | Ruiter et al.    |
| 7,711,004 | B2 | 5/2010  | Xu               |
| 7,957,340 | B2 | 6/2011  | Choi et al.      |
| 7,966,036 | B2 | 6/2011  | Kojima           |
| 8,014,329 | B2 | 9/2011  | Gong             |
| 8,072,913 | B2 | 12/2011 | Desai            |
| 8,078,111 | B2 | 12/2011 | Jovicic et al.   |
| 8,149,715 | B1 | 4/2012  | Goel et al.      |
| 8,170,002 | B2 | 5/2012  | Wentink          |

(Continued)

FOREIGN PATENT DOCUMENTS

| EP | 1860827 | 11/2007 |
| JP | 2006174162 | 6/2006 |

(Continued)

OTHER PUBLICATIONS

"PCT Search Report and Written Opinion", Application No. PCT/US2011/054358, (Dec. 16, 2011), 13 pages.

(Continued)

*Primary Examiner* — Mark Rinehart
*Assistant Examiner* — Angel Brockman (57) ABSTRACT The present disclosure describes techniques for pre-association discovery. In some aspects a frame having information useful to identify a service provided by a wireless device is received, the service provided by the wireless device is identified based on the information of the frame and known service identification information, and the identified service is associated with the wireless device effective to enable use of the identified service.

20 Claims, 6 Drawing Sheets

(56) References Cited

U.S. PATENT DOCUMENTS

| | | |
|---|---|---|
| 8,170,546 B2 | 5/2012 | Bennett |
| 8,189,506 B2 | 5/2012 | Kneckt et al. |
| 8,229,087 B2 | 7/2012 | Sumioka et al. |
| 8,254,296 B1 | 8/2012 | Lambert et al. |
| 8,274,894 B2 | 9/2012 | Kneckt et al. |
| 8,310,967 B1 | 11/2012 | Goel et al. |
| 8,340,034 B1 | 12/2012 | Lee et al. |
| 8,472,427 B1 | 6/2013 | Wheeler et al. |
| 8,553,561 B1 | 10/2013 | Chokshi et al. |
| 8,750,278 B1 | 6/2014 | Wagholikar et al. |
| 2002/0025810 A1 | 2/2002 | Takayama et al. |
| 2002/0049854 A1 | 4/2002 | Cox et al. |
| 2003/0040316 A1 | 2/2003 | Stanforth et al. |
| 2003/0214430 A1 | 11/2003 | Husted et al. |
| 2004/0013128 A1 | 1/2004 | Moreton |
| 2004/0105401 A1 | 6/2004 | Lee |
| 2004/0192222 A1 | 9/2004 | Vaisanen et al. |
| 2004/0233881 A1 | 11/2004 | Kang et al. |
| 2005/0018641 A1 | 1/2005 | Zhao et al. |
| 2005/0025104 A1 | 2/2005 | Fischer et al. |
| 2005/0025174 A1 | 2/2005 | Fischer et al. |
| 2005/0135360 A1 | 6/2005 | Shin et al. |
| 2005/0174962 A1 | 8/2005 | Gurevich |
| 2005/0186962 A1 | 8/2005 | Yoneyama et al. |
| 2005/0195786 A1 | 9/2005 | Shpak |
| 2005/0206554 A1 | 9/2005 | Yamaura |
| 2005/0250528 A1 | 11/2005 | Song et al. |
| 2005/0254423 A1 | 11/2005 | Berghoff |
| 2005/0281278 A1 | 12/2005 | Black et al. |
| 2006/0007863 A1 | 1/2006 | Naghian |
| 2006/0079232 A1 | 4/2006 | Omori et al. |
| 2006/0120338 A1 | 6/2006 | Hwang et al. |
| 2006/0199565 A1 | 9/2006 | Ammirata |
| 2006/0200862 A1 | 9/2006 | Olson et al. |
| 2006/0215601 A1 | 9/2006 | Vleugels et al. |
| 2006/0251198 A1 | 11/2006 | Ma et al. |
| 2006/0252418 A1 | 11/2006 | Quinn et al. |
| 2006/0264179 A1 | 11/2006 | Bonneville et al. |
| 2006/0268756 A1 | 11/2006 | Wang et al. |
| 2006/0268804 A1 | 11/2006 | Kim et al. |
| 2006/0282541 A1 | 12/2006 | Hiroki |
| 2006/0282667 A1 | 12/2006 | Kim et al. |
| 2006/0286935 A1 | 12/2006 | Utsunomiya et al. |
| 2007/0010237 A1 | 1/2007 | Jones et al. |
| 2007/0010247 A1 | 1/2007 | Mouna-Kingue et al. |
| 2007/0014314 A1 | 1/2007 | O'Neil |
| 2007/0109973 A1 | 5/2007 | Trachewsky |
| 2007/0178888 A1 | 8/2007 | Alfano et al. |
| 2007/0183443 A1 | 8/2007 | Won |
| 2007/0206519 A1 | 9/2007 | Hansen et al. |
| 2007/0206762 A1 | 9/2007 | Chandra et al. |
| 2007/0223430 A1 | 9/2007 | Desai et al. |
| 2007/0238482 A1 | 10/2007 | Rayzman et al. |
| 2007/0242645 A1 | 10/2007 | Stephenson et al. |
| 2007/0268862 A1 | 11/2007 | Singh et al. |
| 2007/0286298 A1 | 12/2007 | Choi et al. |
| 2007/0297388 A1 | 12/2007 | Appaji et al. |
| 2008/0056201 A1 | 3/2008 | Bennett |
| 2008/0069034 A1 | 3/2008 | Buddhikot et al. |
| 2008/0080446 A1 | 4/2008 | Chung |
| 2008/0095058 A1 | 4/2008 | Dalmases et al. |
| 2008/0095059 A1 | 4/2008 | Chu |
| 2008/0100494 A1 | 5/2008 | Yamaura |
| 2008/0130595 A1* | 6/2008 | Abdel-Kader ............... 370/338 |
| 2008/0137580 A1 | 6/2008 | Axelsson et al. |
| 2008/0139212 A1 | 6/2008 | Chen et al. |
| 2008/0161031 A1 | 7/2008 | Tu |
| 2008/0170550 A1 | 7/2008 | Liu et al. |
| 2008/0181154 A1 | 7/2008 | Sherman |
| 2008/0187003 A1 | 8/2008 | Becker |
| 2008/0232287 A1 | 9/2008 | Shao et al. |
| 2008/0259846 A1 | 10/2008 | Gonikberg et al. |
| 2008/0261640 A1* | 10/2008 | Yoshida ............... 455/517 |
| 2008/0262991 A1* | 10/2008 | Kapoor et al. ............... 706/20 |
| 2008/0279163 A1 | 11/2008 | Desai |
| 2008/0320108 A1* | 12/2008 | Murty et al. ............... 709/220 |
| 2009/0010210 A1 | 1/2009 | Hiertz et al. |
| 2009/0137206 A1 | 5/2009 | Sherman et al. |
| 2009/0175250 A1* | 7/2009 | Mathur et al. ............... 370/338 |
| 2009/0196210 A1 | 8/2009 | Desai |
| 2009/0239471 A1 | 9/2009 | Tran et al. |
| 2009/0245133 A1 | 10/2009 | Gupta et al. |
| 2009/0245279 A1 | 10/2009 | Wan et al. |
| 2009/0247217 A1 | 10/2009 | Hsu et al. |
| 2009/0258603 A1 | 10/2009 | Ghaboosi et al. |
| 2009/0268652 A1 | 10/2009 | Kneckt et al. |
| 2009/0285264 A1 | 11/2009 | Aldana et al. |
| 2010/0011231 A1 | 1/2010 | Banerjea et al. |
| 2010/0029325 A1 | 2/2010 | Wang et al. |
| 2010/0061244 A1 | 3/2010 | Meier et al. |
| 2010/0069112 A1 | 3/2010 | Sun et al. |
| 2010/0130129 A1 | 5/2010 | Chang et al. |
| 2010/0138549 A1 | 6/2010 | Goel et al. |
| 2010/0165896 A1 | 7/2010 | Gong et al. |
| 2010/0238793 A1 | 9/2010 | Alfano et al. |
| 2010/0316027 A1 | 12/2010 | Rick et al. |
| 2010/0322213 A1* | 12/2010 | Liu et al. ............... 370/338 |
| 2011/0002226 A1 | 1/2011 | Bhatti |
| 2011/0007675 A1 | 1/2011 | Chiou et al. |
| 2011/0009074 A1 | 1/2011 | Hsu et al. |
| 2011/0097998 A1 | 4/2011 | Ko et al. |
| 2011/0103363 A1 | 5/2011 | Bennett |
| 2011/0161697 A1 | 6/2011 | Qi et al. |
| 2011/0194519 A1 | 8/2011 | Habetha |
| 2012/0276938 A1 | 11/2012 | Wagholikar et al. |
| 2013/0176903 A1 | 7/2013 | Bijwe |

FOREIGN PATENT DOCUMENTS

| | | |
|---|---|---|
| WO | WO-2006043956 | 4/2006 |
| WO | WO-2006090254 | 8/2006 |
| WO | WO-2007008981 | 1/2007 |
| WO | WO-2007064822 | 6/2007 |
| WO | WO-2008707777 | 6/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

"PCT Search Report and Written Opinion", Application No. PCT/US2013/025144, Jun. 5, 2013, 10 pages.

"Non-Final Office Action", U.S. Appl. No. 12/167,841, Jul. 15, 2011, 10 pages.

"Notice of Allowance", U.S. Appl. No. 12/167,841, Nov. 25, 2011, 11 pages.

"Non-Final Office Action", U.S. Appl. No. 13/099,169, Mar. 28, 2013, 12 pages.

"Non-Final Office Action", U.S. Appl. No. 13/673,363, Nov. 29, 2013, 12 pages.

"IEEE Standard for Information Technology—Telecommunications and Information Exchange between Systems—Local and Metropolitan Area Networks—Specific Requirements", IEEE Std. 802.11-2007, Jun. 12, 2007, 1232 pages.

"International Search Report and Written Opinion", PCT Application PCT/US2012/035597, Aug. 6, 2012, 13 pages.

"Non-Final Office Action", U.S. Appl. No. 13/429,090, Oct. 24, 2013, 13 pages.

"Non-Final Office Action", U.S. Appl. No. 12/484,563, Oct. 4, 2011, 13 pages.

"Non-Final Office Action", U.S. Appl. No. 12/732,036, Aug. 9, 2012, 13 pages.

"Non-Final Office Action", U.S. Appl. No. 13/479,124, Sep. 27, 2013, 14 pages.

"Final Office Action", U.S. Appl. No. 12/646,802, Nov. 15, 2012, 15 pages.

"Non-Final Office Action", U.S. Appl. No. 12/646,721, Nov. 7, 2012, 15 pages.

"Non-Final Office Action", U.S. Appl. No. 12/646,721, May 10, 2012, 15 pages.

(56) References Cited

OTHER PUBLICATIONS

"Wi-Fi Peer-to-Peer (P2P) Technical Specification", Wi-Fi Alliance Technical Committee P2P Task Group; Draft Version 1.14, Jun. 25, 2010, 154 pages.

"Final Office Action", U.S. Appl. No. 12/646,721, Jun. 6, 2013, 16 pages.

"Non-Final Office Action", U.S. Appl. No. 12/646,802, Mar. 29, 2012, 16 pages.

"Non-Final Office Action", U.S. Appl. No. 13/722,354, Jan. 17, 2014, 17 pages.

"Final Office Action", U.S. Appl. No. 12/484,563, Apr. 24, 2012, 18 pages.

"PCT Search Report and Written Opinion", Application No. PCT/IB2013/000390, Aug. 21, 2013, 19 Pages.

"Final Office Action", U.S. Appl. No. 12/616,454, Apr. 11, 2012, 19 pages.

"Non-Final Office Action", U.S. Appl. No. 12/186,429, Apr. 25, 2011, 19 pages.

"Non-Final Office Action", U.S. Appl. No. 12/542,845, Apr. 4, 2012, 19 pages.

"Supplemental Notice of Allowance", U.S. Appl. No. 12/186,429, Jul. 10, 2013, 2 pages.

"Supplemental Notice of Allowance", U.S. Appl. No. 12/716,569, Jul. 23, 2012, 2 pages.

"Final Office Action", U.S. Appl. No. 12/186,429, Oct. 13, 2011, 23 pages.

"Final Office Action", U.S. Appl. No. 12/542,845, Sep. 25, 2012, 23 pages.

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specification; Ammendment 1: Radio Resource Measurement of Wireless LANs; IEEE Std 802.11k-2008, Jun. 12, 2008, 244 pages.

"Draft Standard for Information Technology—Telecommunications and information exchange between systems—Local and metropolitan area networks—Specific requirements", IEEE P802.11s/D1.03, Apr. 2007, 251 pages.

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.

"Non-Final Office Action", U.S. Appl. No. 12/542,845, Oct. 23, 2013, 29 pages.

"Advisory Action", U.S. Appl. No. 12/646,721, Aug. 13, 2013, 3 pages.

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; 3GPP Organizational Partners, 2012, 302 pages.

"Notice of Allowance", U.S. Appl. No. 12/616,454, Aug. 22, 2012, 4 pages.

"Restriction Requirement", U.S. Appl. No. 12/167,841, May 12, 2011, 6 pages.

"Notice of Allowance", U.S. Appl. No. 12/484,563, Jul. 9, 2012, 6 pages.

"Notice of Allowance", U.S. Appl. No. 13/479,124, Jan. 30, 2014, 7 pages.

"Notice of Allowance", U.S. Appl. No. 12/716,569, Apr. 19, 2012, 7 pages.

"Notice of Allowance", U.S. Appl. No. 12/732,036, Feb. 21, 2013, 8 pages.

"Non-Final Office Action", U.S. Appl. No. 12/616,454, Dec. 22, 2011, 8 pages.

"Introduction to 802.11n Outdoor Wireless Networks", InscapeData White Paper, Mar. 29, 2011, 9 pages.

"Notice of Allowance", U.S. Appl. No. 12/186,429, Jun. 6, 2013, 9 pages.

"Non-Final Office Action", U.S. Appl. No. 13/099,169, Oct. 4, 2013, 9 pages.

"IEEE Standard for Information Technology—Telecommunications and information exchange between systems—Local and metropolitan area networks—Specific requirements Part 11: Wireless LAN Medium Access Control (MAC) and Physical Layer (PHY) specifications Amendment", IEEE Computer Society, Oct. 14, 2010, pp. 12-18, 23, 65-68.

"Part 11: Wireless LAN Medium Access Control (MAC) and Physical Layer (PHY) specifications", IEEE Std 802.11b-1999/Cor 1-2001, Amendment 2: Higher-speed Physical Layer (PHY) extension in the 2.4 GHz band,Nov. 7, 2001, 23 pages.

"Further Higher Data Rate Extension in the 2.4 GHz Band", IEEE P802.11g/D8.2, DRAFT Supplement to STANDARD [for] Information Technology, Apr. 2003. 69 pages.

"Part 11: Wireless LAN Medium Access Control (MAC) and Physical Layer (PHY) specifications", IEEE Std 802.11a-1999, High-speed Physical Layer in the 5 GHz Band,1999, 91 pages.

"Part 11: Wireless LAN Medium Access Control (MAC) and Physical Layer (PHY) specifications", Information technology—Telecommunications and information exchange between systems—Local and metropolitan area networks—Specific requirements—, IEEE, Apr. 2003, pp. 1-69.

Haas, et al., "Gossip-Based Ad Hoc Routing", IEEE/ACM Transactions on Networking, vol. 14, No. 3, Jun. 2006, pp. 479-491.

Mujtaba, "TGn Sync Proposal Technical Specification", IEEE 802.11-04 / Wireless LANs, May 2005, pp. 1-131.

Mujtaba, "TGn Sync Proposal Technical Specification", IEEE 802.11-04/0889r6, This document presents the technical specification for the MAC and the PHY layer of the TGn Sync proposal to IEEE 802.11 TGn,May 18, 2005, pp. 1-131.

"Non-Final Office Action", U.S. Appl. No. 12/646,721, filed May 8, 2014, 17 pages.

"Non-Final Office Action", U.S. Appl. No. 12/646,802, filed May 21, 2014, 19 pages.

"Notice of Allowance", U.S. Appl. No. 13/673,363, filed Mar. 24, 2014, 4 pages.

"Notice of Allowance", U.S. Appl. No. 13/722,354, filed May 15, 2014, 4 pages.

"Supplemental Notice of Allowance", U.S. Appl. No. 13/479,124, filed Apr. 18, 2014, 5 pages.

* cited by examiner

PRE-ASSOCIATION DISCOVERY

RELATED APPLICATIONS

This present disclosure claims priority to U.S. Provisional Patent Application Ser. No. 61/405,052 filed Oct. 20, 2010, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Computing devices often rely on peripheral devices to provide services which can increase or extend capabilities of a computing device. These peripheral devices typically include an interface for communicating with a computing device over a wireless connection. While this wireless connection allows a peripheral device to provide a service without being physically cabled to the computing device, finding and configuring a peripheral device over a wireless connection can be difficult. Complex software protocols for finding peripherals within a wireless network are often slow, fail to differentiate between peripheral types, and incapable of fully configuring a peripheral device once found. Configuring a peer-to-peer wireless connection to a peripheral can be a complex, multi-step process that is reliant on user configuration of the computing device and/or the peripheral device. A peripheral connection process that is complex, time consuming, or reliant on user interaction may compromise a user's experience with the computing device and/or peripheral device.

SUMMARY

This summary is provided to introduce subject matter that is further described below in the Detailed Description and Drawings. Accordingly, this Summary should not be considered to describe essential features nor used to limit the scope of the claimed subject matter.

A method is described for receiving a frame having information useful to identify a service provided by a wireless device from which the frame was received, identifying the service provided by the wireless device based on the information of the frame and known service identification information, and associating the identified service with the wireless device effective to enable use of the identified service.

Another method is described for broadcasting a frame including information identifying a service that is accessible via a wireless network, receiving a request to associate with the wireless network from a wireless device capable of accessing the service, and granting the request to associate with the wireless network to enable the wireless device to access the service over the wireless network.

Still another method is described for receiving a request for a service, configuring a wireless interface to receive beacons identifying services accessible via respective wireless networks, receiving one or more of the beacons identifying services accessible, determining which service accessible via the respective wireless networks corresponds with the request for the service, and causing the wireless interface to associate with one of the wireless networks through which the corresponding service is accessible to fulfill the request for the service.

BRIEF DESCRIPTION OF THE DRAWINGS

The details of one or more implementations are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

Conventional techniques for finding and configuring a peripheral device over a wireless connection are typically complex, time consuming, and reliant on manual configuration of a computing device and/or the peripheral device. This disclosure describes apparatuses and techniques for pre-association discovery that often permit services accessible via wireless networks to be discovered and accessed more-quickly or with little or no manual configuration. These services can be identified based on a frame received, thereby precluding the need to pre-configure a connection with a wireless network of the device providing the service.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
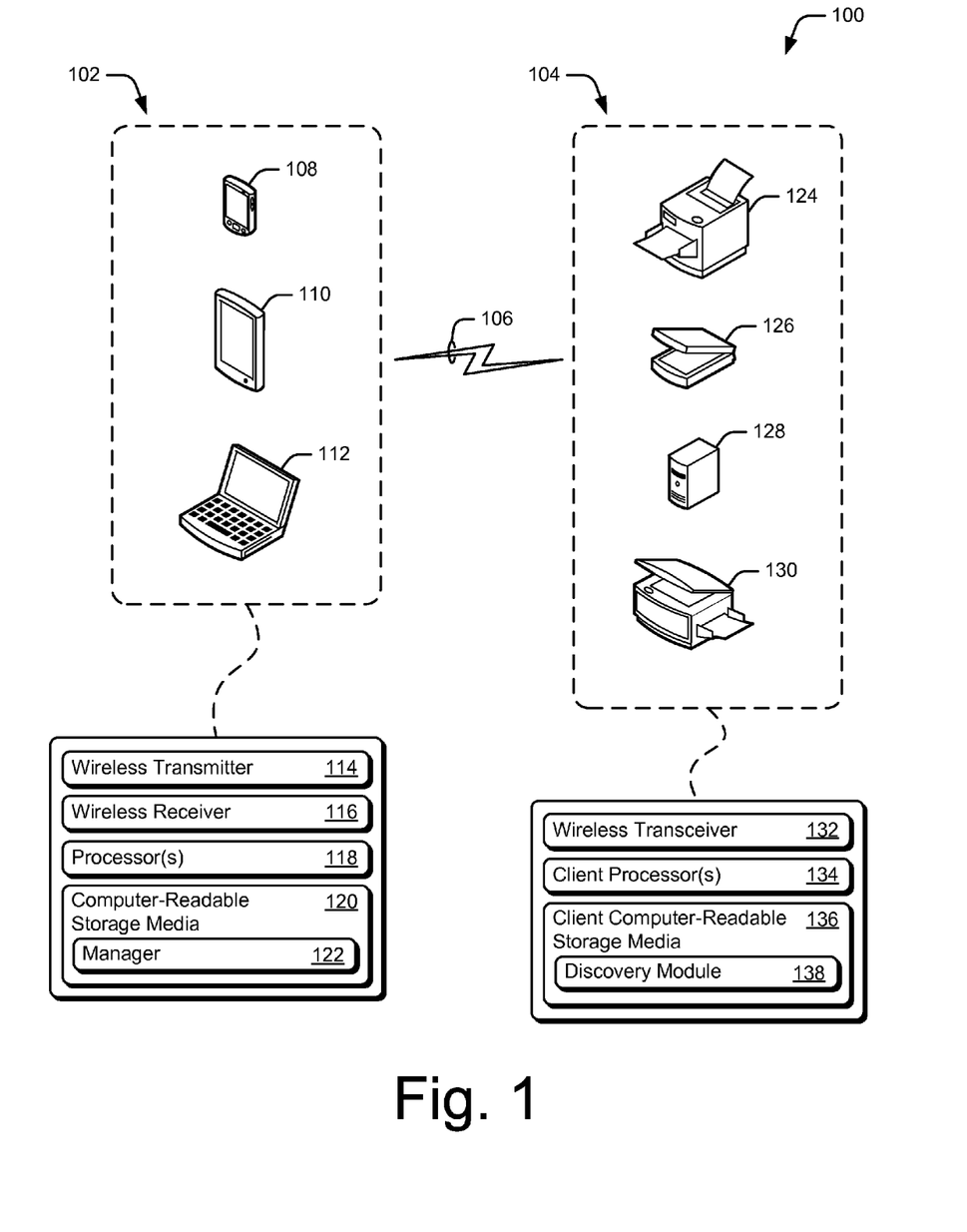
FIG. 1 illustrates an operating environment having wireless devices in accordance with one or more aspects.

FIG. 1 illustrates an example operating environment 100 having host computing devices 102 (host devices 102) and client computing devices 104 (client devices 104), each of which are capable of communicating data, packets, and/or frames over a wireless connection 106, such as a wireless-local-area network (WLAN). Host computing devices 102 include smart-phone 108, tablet computer 110, and laptop computer 112. Although not shown, other configurations of host computing devices 102 are also contemplated such as a desktop computer, a server, mobile-internet device (MID), mobile gaming console, and so on.

Each of host devices 102 includes a wireless transmitter 114 and a wireless receiver 116 for providing a wireless interface to handle various communication protocols, such as for example the 802.11 family of protocols. Transmitter 114 and receiver 116 may be separate (shown) or combined (not shown) and may be hardware combined with or separate from firmware or software. Host devices 102 also include processor(s) 118, computer-readable storage media 120 (CRM 120), and wireless-service manager 122 (manager 122), which, in one implementation, is embodied on CRM 120. CRM 120 may include any suitable memory or storage device such as random-access memory (RAM), read-only memory (ROM), or Flash memory useful to store data of applications and/or an operating system of the host device 102. How manager 122 is implemented and used varies and is described below.

Client devices 104 include printer 124, scanner 126, network-attached storage (NAS) 128, and multi-function printer 130. Other client devices contemplated include various peripheral and/or accessory devices, such as cameras, digital picture frames, displays, televisions, speakers, and so on. Each client device 104 provides one or more services (e.g., capabilities or functions) that are accessible to a communicatively coupled host device 102. For example, tablet computer 110 is able to access print functions of printer 124 when connected by wire or wirelessly. Any of these devices may act as an access point or a client station of a wireless network, and may be dynamically configured to do so.

Each of client devices 104 includes wireless transceiver 132 providing a wireless interface to handle various communication protocols, such as those mentioned above and elsewhere herein. Although shown as a single transceiver, wireless transceiver 132 may be implemented as a separate transmitter and receiver, and may be hardware combined with or separate from firmware or software. Client devices 104 also include client processor(s) 134, client computer-readable storage media 136 (client CRM 136), and service discovery module 138 (discovery module 138), which, in one implementation, is embodied on client CRM 136. Client CRM 136 may include any suitable memory or storage device such as static RAM (SRAM), ROM, or Flash memory useful to store data of applications and/or an operating system of the client device 104. How discovery module 138 is implemented and used varies and is described below.

Figure 2:
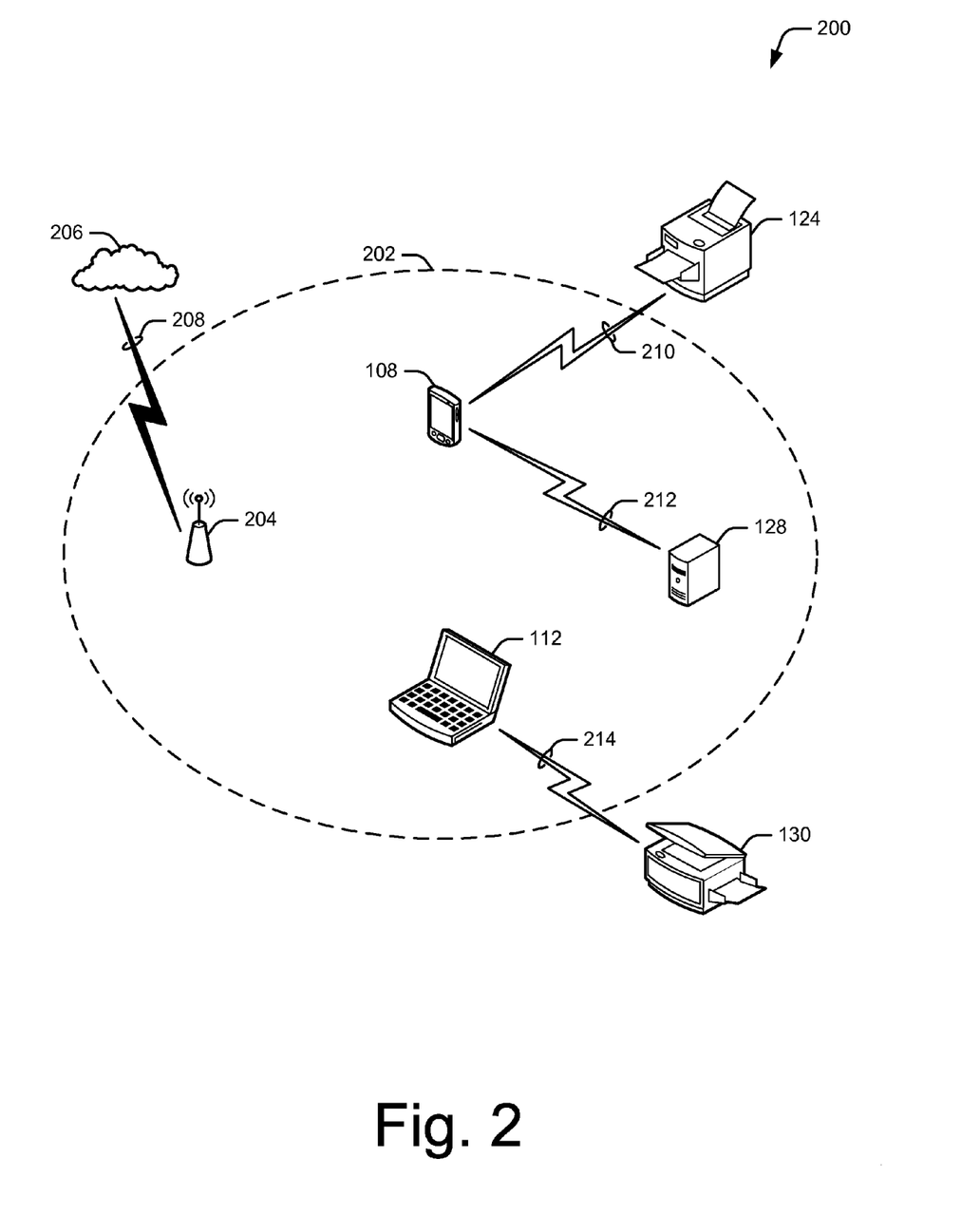
FIG. 2 illustrates an example of devices of FIG. 1 communicating wirelessly in accordance with one or more aspects.

FIG. 2 illustrates an example of device environment 200 that includes a WLAN network 202 (network 202) managed by access point 204. Access point 204 provides connectivity to Internet 206 or other networks via backhaul link 208, which may be either wired or wireless (e.g., a wireless-wide-area network). While associated with network 202, smart-phone 108 and laptop computer 112 have internet access and/or connectivity with other networks for which access point 204 acts as a gateway.

Client devices 104, when within range of access point 204 may also associate with network 202, such as NAS 128, which is shown within network 202. NAS 128 may stream music, download video, or sync data with an online storage account (not shown) via Internet 206 when associated with network 202. Alternately or additionally, when associated with network 202, services of a client device 104 may be accessible to host devices 102 also associated with network 202.

As described above, client devices 104 may act as either a client station or an access point. In some cases, printer 124, NAS 128, and multifunction printer 130, may each be configured to act as an access point. In such a case, techniques of pre-association discovery allow host devices 102 to communicate directly with client devices 104. For example, smart-phone 108 can communicate directly with printer 124 over wireless network 210 or NAS 128 over wireless network 212. Additionally, laptop computer 112 can communicate directly with multifunction printer 130 over wireless network 214. These are but a few examples of implementing techniques of pre-association discovery which are described below.

Techniques of Pre-Association Discovery

The following discussion describes techniques of pre-association discovery. These techniques can be implemented using the previously described environments, such as manager 122 of FIG. 1 embodied on a host device 102 and/or discovery module 138 of FIG. 1 embodied on a client device 104. These techniques include methods illustrated in FIGS. 3, 4, and 5, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIG. 2 by way of example. Such reference is not to be taken as limited to operating environment 100 but rather as illustrative of one of a variety of examples.

Figure 3:
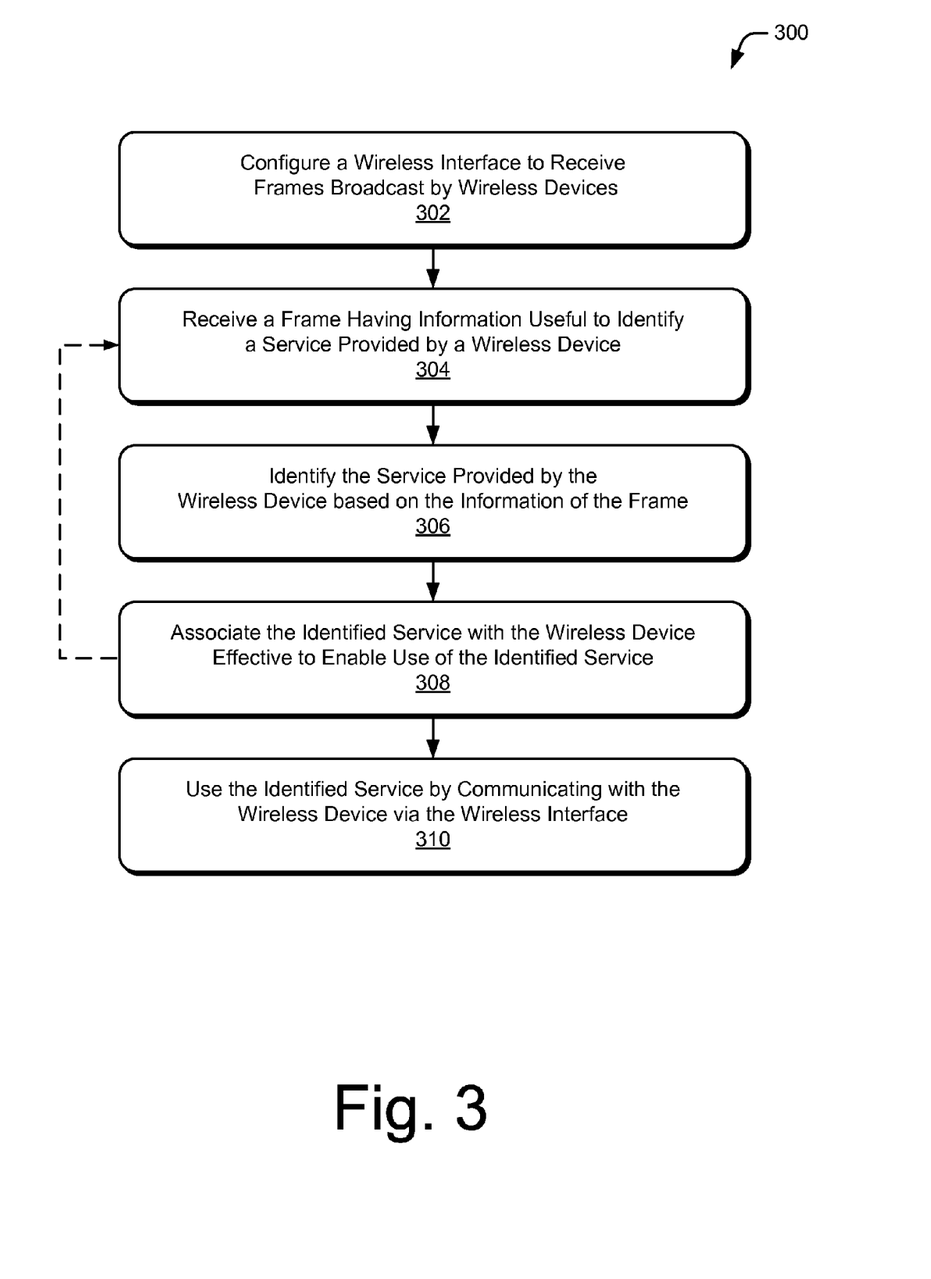
FIG. 3 illustrates a method of identifying a service provided by a wireless device.

FIG. 3 depicts a method 300 for identifying a service provided by a wireless device, including operations performed by manager 122 of FIG. 1.

At 302, a wireless interface is configured to receive frames broadcast by wireless devices. In some cases, a previously-associated wireless network is disassociated from prior to the configuration. The wireless interface may be configured to scan or listen for frames or beacons of the other wireless devices, such as WLAN beacons or management frames.

As an example, consider smart-phone 108 in the context of FIG. 2, which shows smart-phone 108 within wireless network 202. Assume here that smart-phone 108 is associated with wireless network 202 and browsing content of Internet 206, when a user decides to print a webpage. Here, manager 122 causes a wireless interface (e.g., wireless transmitter 114/wireless receiver 116) of smart-phone 108 to disassociate from wireless network 202. Manager 122 then configures the wireless interface to receive frames or beacons from other wireless devices, such as printer 124, NAS 128, and multi-function printer 130.

At 304, a frame is received from a wireless device, the frame having information useful to identify a service provided by the wireless device. The frame may include a dedicated field to store the identification information or other information of the frame may be encoded with the identification information. In some cases, the frame is a beacon or management frame of a WLAN network provided by the wireless device and the information useful to identify the service is within a service set identity (SSID) field. In such a case, data of the SSID field may be patterned or encoded such that a portion of the SSID data is useful to identify the service.

For example, an SSID field of 32 bytes can be provisioned or portioned such that a network name is stored in the first 24 bytes and the identification information is stored in the remaining 8 bytes. These remaining 8 bytes can then be encoded to identify a class, a type, or functionality of the service provided by the wireless device. Note that the SSID field can be portioned into any suitable number of sub-fields having various numbers of bytes without departing from the spirit or intent of the present disclosure.

In the context of the present example, smart-phone 108 receives a beacon from printer 124. Assume here that the beacon contains an SSID field that is portioned as described above, with the last 8 bytes of the SSID field describing print services provided by printer 124. Smart-phone 108 may also receive similar packets from NAS 128, which provides data storage and/or multifunction printer 130, which provides printing and scanning.

At 306, the service provided by the wireless device is identified based on the information of the frame and known service identification information (known information). In some cases, the service is identified by comparing or matching the information of the frame with the known information. In such a case, a regular expression pattern matching algorithm may be used. The known information may be complimentary or reciprocal to the information of the frame defining services for a given byte pattern or encoding, such as the SSID pattern described above. If a service is not identified, additional information may be downloaded or received from a user to supplement the known information.

Continuing the ongoing example, manager 122 compares the last 8 bytes of the SSID field with known information to identify print services of printer 124. Assume here that manager 122 is also able to identify services provided by NAS 128 and multifunction printer 130 by comparing bytes of their respective SSIDs with the known information.

At 308, the identified service is associated with the wireless device effective to enable use of the identified service via the wireless interface. In some cases, the identified service is associated with a wireless network provided by the wireless device. For instance, the identified service can be associated with the name of the network provided by the wireless device as described by the SSID field. Once associated, the identified service can be accessed when the wireless interface connects with a wireless network of the wireless device providing the service. Optionally, additional services may be discovered by returning to block 304 and repeating an iteration of blocks 304, 306, and 308.

In the context of the present example, manager 122 associates the identified print services of printer 124 with the SSID of a wireless network provided by printer 124. Here, manager 122 repeats operations of blocks 304, 306, and 308, associating identified data storage services with a SSID of NAS 128, and other identified print and scan services with a SSID of multifunction printer 130.

At 310, access of the identified service is initiated by causing the wireless interface to associate with a wireless network provided by the wireless device. Once associated with the wireless network of the wireless device, the identified service can be accessed.

Concluding the present example, manager 122 causes the wireless interface of smart-phone 108 to associate with wireless network 210 of printer 124. Once associated with wireless network 210, applications of smart-phone 108 can access the print services of printer 124 and print the webpage. Additionally, manager 122 can cause the wireless interface of smart-phone 108 to associate with wireless network 212 or wireless network 214 to access data or scanning services.

Figure 4:
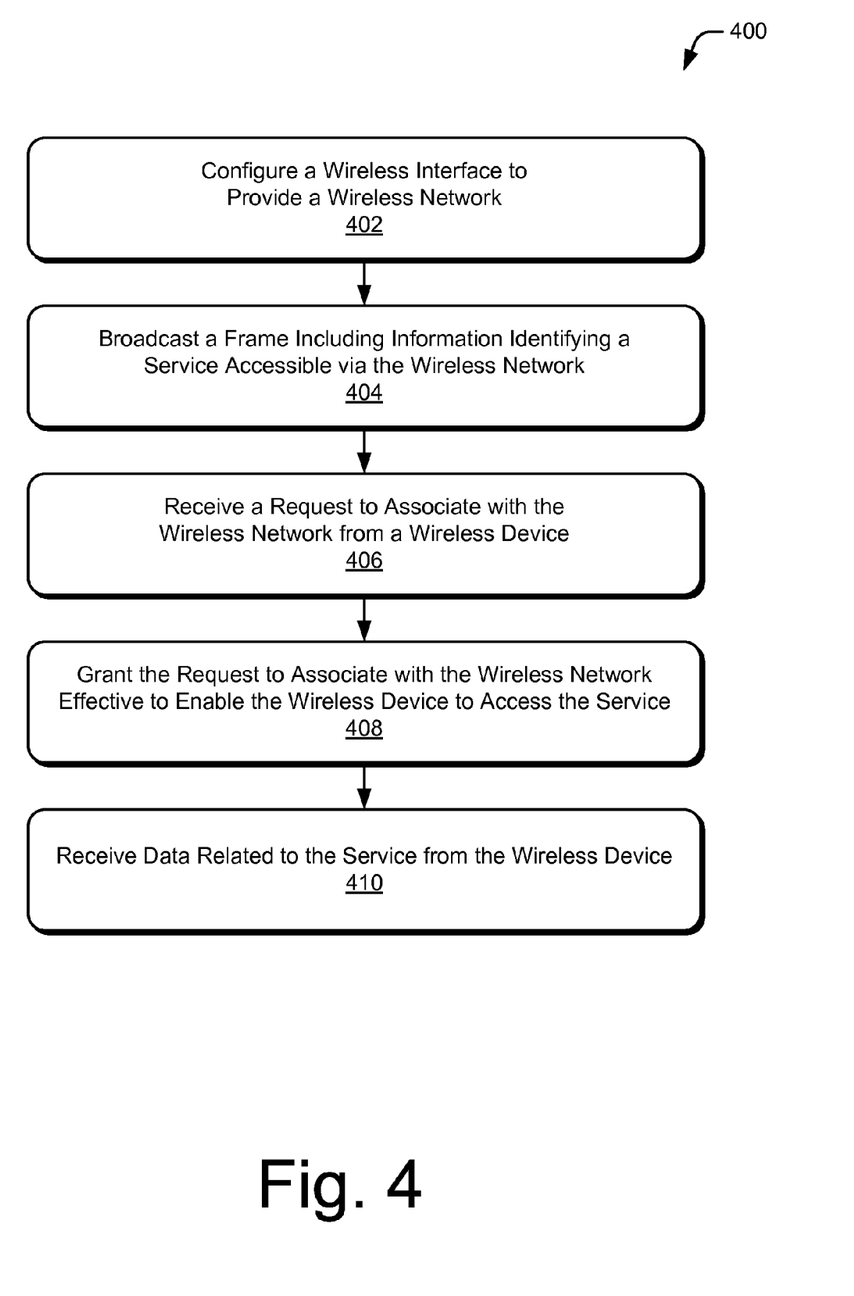
FIG. 4 illustrates a method of enabling a wireless device to access a service via a wireless network.

FIG. 4 depicts a method 400 for enabling a wireless device to access a service via a wireless network, including operations performed by discovery module 138 of FIG. 1.

At 402, a wireless interface is configured to provide a wireless network. The wireless network may be any suitable type of network, such as a WLAN network implementing protocols compliant with an IEEE 802.11 specification. In some cases, the wireless interface enters an access point mode to provide the wireless network.

As an example, consider NAS 128 in the context shown in FIG. 2, which shows NAS 128 within wireless network 202. Assume here that a wireless interface (e.g., transceiver 132) of NAS 128 is operating in a client mode and associated with wireless network 202. Discovery module 138 configures the wireless interface of NAS 128 to operate in an access point mode to provide wireless network 212.

At 404, a frame is broadcast that includes information identifying a service accessible via the wireless network. The frame can be a beacon or management frame transmitted to identify or manage the wireless network. By broadcasting the frame, the service accessible via the wireless network may be discovered by wireless devices within range. In some cases, the information identifying the service is located within a field of the frame or beacon, such as an SSID field. In such a case, bytes of the SSID field can be encoded such that a portion of the SSID is useful to identify the service.

For example, multiple devices within a wireless network may have SSIDs sharing a common, or invariant, portion which identifies a network name. Each of these devices may then have a unique, or variant, portion of the SSID to identify different services provided by each device. In the context of the present example, discovery module 138 causes the wireless interface of NAS 128 to broadcast a beacon with an SSID identifying data storage services accessible via wireless network 212.

At 406, a request to associate with the wireless network is received from a wireless device capable of accessing the service. The request may be received from any wireless device within range of the wireless interface. In some cases, the wireless device has information that is complimentary or reciprocal to the information identifying the service accessible via the wireless network.

Continuing the ongoing example, a request to associate with wireless network 212 is received from smart-phone 108. Assume here that smart-phone 108 is attempting to backup user data stored within CRM 120 and is within range of wireless network 212.

At 408, the request to associate with the wireless network is granted effective to enable the wireless device to access the service over the wireless network. Once the request to associate with the wireless network is granted, the wireless device may communicate or otherwise interact with the service accessible over the wireless network. In some cases, the request to associate may be denied if the wireless device is unable to provide an encryption key (for an encrypted network) or pass authentication. In the context of the ongoing example, discovery module 138 grants the request of smart-phone 108 to associate with wireless network 214.

At 410, data related to the service is received from the wireless device in response to enabling access to the service. The data received may be any suitable type of data, such as print data, data for storage, multimedia data, a request for scanning service, and so on. Concluding the present example, NAS 128 receives user data from smart-phone 108 to store. Once complete, either or both of NAS 128 or smart-phone 108 may disassociate from wireless network 212 and associate with wireless network 202 for access to Internet 206.

Figure 5:
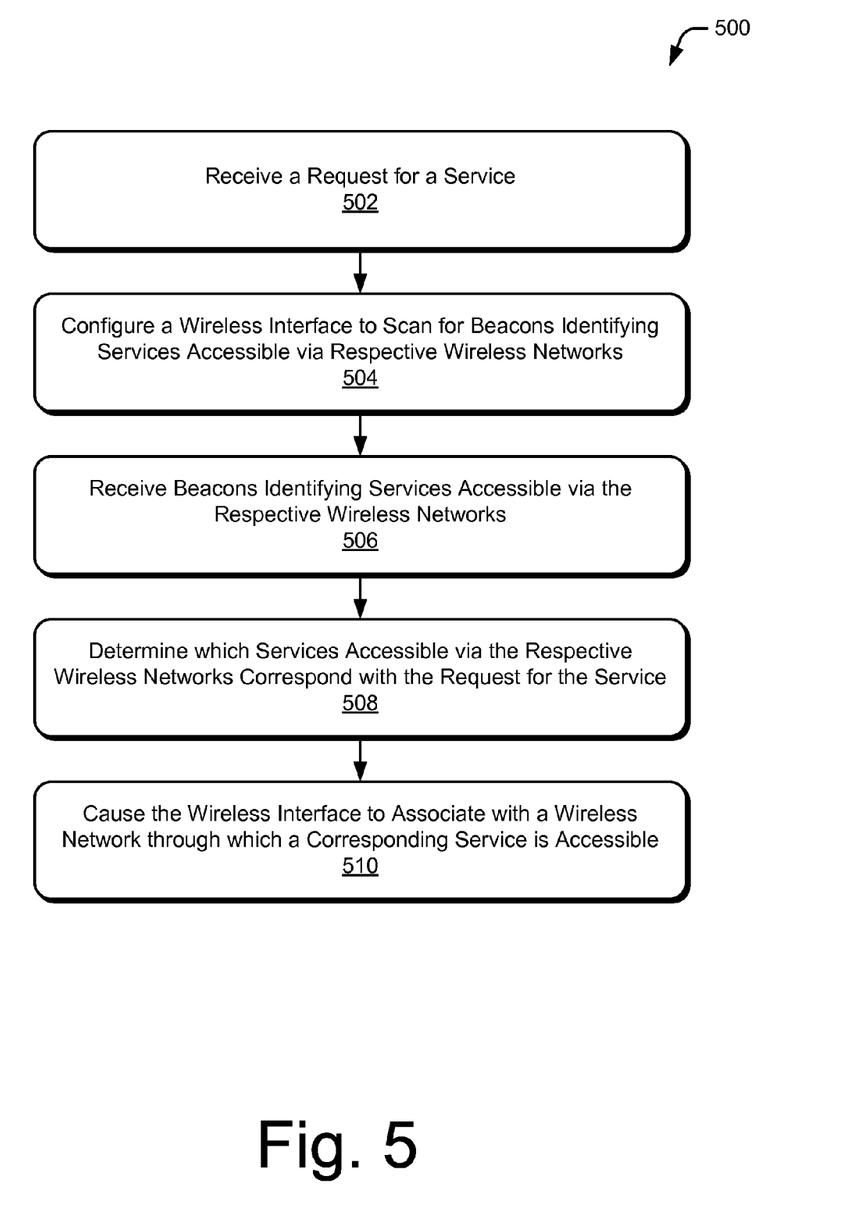
FIG. 5 illustrates a method of causing a wireless interface to associate with a wireless network through which a service is accessible.

FIG. 5 depicts a method 500 for causing a wireless interface to associate with a wireless network through which a service is accessible, including operations performed by manager 122 of FIG. 1.

At 502, a request for a service is received. The request for service can be received from an application or operating system component. In some cases, the request for service is received responsive to user interaction, such as a user input requesting printing or scanning of content. As an example, consider laptop computer 112 in the context of FIG. 2, which shows laptop computer 112 within wireless network 202. Assume here that a user of laptop computer 112 selects to print slides of a presentation. Manager 122 receives, in response to the user print selection, a request for print services from the presentation editing application of laptop computer 112.

At 504, a wireless interface is configured to scan for beacons identifying services accessible via respective wireless networks. In some cases, a previously-associated wireless network is disassociated from prior to the configuration. The wireless interface may be configured to scan or listen for frames or beacons of the other wireless devices, such as WLAN beacons or management frames.

In the context of the present example, manager 122 causes a wireless interface (e.g., wireless transmitter 114/wireless receiver 116) of laptop computer 112 to disassociate from wireless network 202. Manager 122 then configures the wireless interface to receive frames or beacons from other wireless devices, such as printer 124, NAS 128, and multifunction printer 130.

At 506, beacons identifying services accessible via the respective wireless networks are received. The beacons may include a field storing information identifying the services or other information of the frame may be encoded with the information identifying the services. In some cases, the beacon is a frame of a WLAN network provided by a respective wireless device and the information identifying the service is within a service set identity (SSID) field. In such a case, data of the SSID field may be patterned or encoded such that a portion of the SSID data is useful to identify the service.

Continuing the ongoing example, laptop computer 112 receives beacons from printer 124, NAS 128, and multifunction printer 130, each of which identify services provided by a respective device by use of the SSID field. Assume here that the SSID field of each beacon is portioned into three parts: an invariant network name sub-field of 24 bytes, a variant medium-access controller (MAC) address sub-field of 6 bytes, and a variant service identifier sub-field of 2 bytes.

This results in a beacon broadcast by printer 124 having an SSID of "ServicesNet-04A91B-04", where "ServicesNet" is a network name shared by printer 124, NAS 128, and multifunction printer 130. Additionally, "04A91B" are hexadecimal values of the MAC address of printer 124 useful to distinguish printer 124 from other printers, and "04" is an encoded value of the print services accessible from printer 124. NAS 128 and multifunction printer 130 both have similar SSIDs, with varying MAC address and service identifier sub-fields. As noted above, this is but one configuration of an SSID field, as any suitable number and/or size of sub-fields may be used.

At 508, services accessible via the respective wireless networks, which correspond to the request for service are determined. A regular expression matching algorithm may be used to determine which services accessible correspond to the service request. In some cases, information from the beacons identifying the accessible services is compared with the request for service to make the determination. For instance, if the request for service is a scanning request, known indexing information of a scanning service can be compared with a service identifier sub-field of an SSID.

Once the corresponding services are determined, a list of the corresponding services can be presented via a user interface for selection. Additionally, signal strength of a wireless network through which a service is accessible may be used to determine a distance to a device providing the service. Using this information, the corresponding services in the list presented to the user can be arranged based on the distance to the device providing the service.

In the context of the current example, manager 122 determines that print services accessible via wireless networks 210 and 214 correspond to the request for print service. Here, manager 122 also determines that multifunction printer 130 is closer based on the relative signal strengths of wireless networks 210 and 214. A user interface is then presented by manager 122 listing wireless networks 210 and 214 as providing print services, with wireless network 214 at the top of the list due to proximity.

At 510, a wireless interface is caused to associate with a wireless network through which a corresponding service is accessible. Once associated with the wireless network of the wireless device, the corresponding service can be accessed to fulfill the request for service. Additionally, after accessing the corresponding service, the wireless interface may re-associate with a previously-associated network to resume activity over that network.

Concluding the present example, manager 122 causes the wireless interface of laptop computer 112 to associate with wireless network 214 responsive to selection through the user interface. Once associated with wireless network 214, the request for print service is fulfilled by communicating print data of the slides to multifunction printer 130. Manager 122 then causes the wireless interface of laptop computer 112 to disassociate from wireless network 214, at which point the wireless interface can re-associate with wireless network 202 for access to Internet 206.

System-on-Chip

Figure 6:
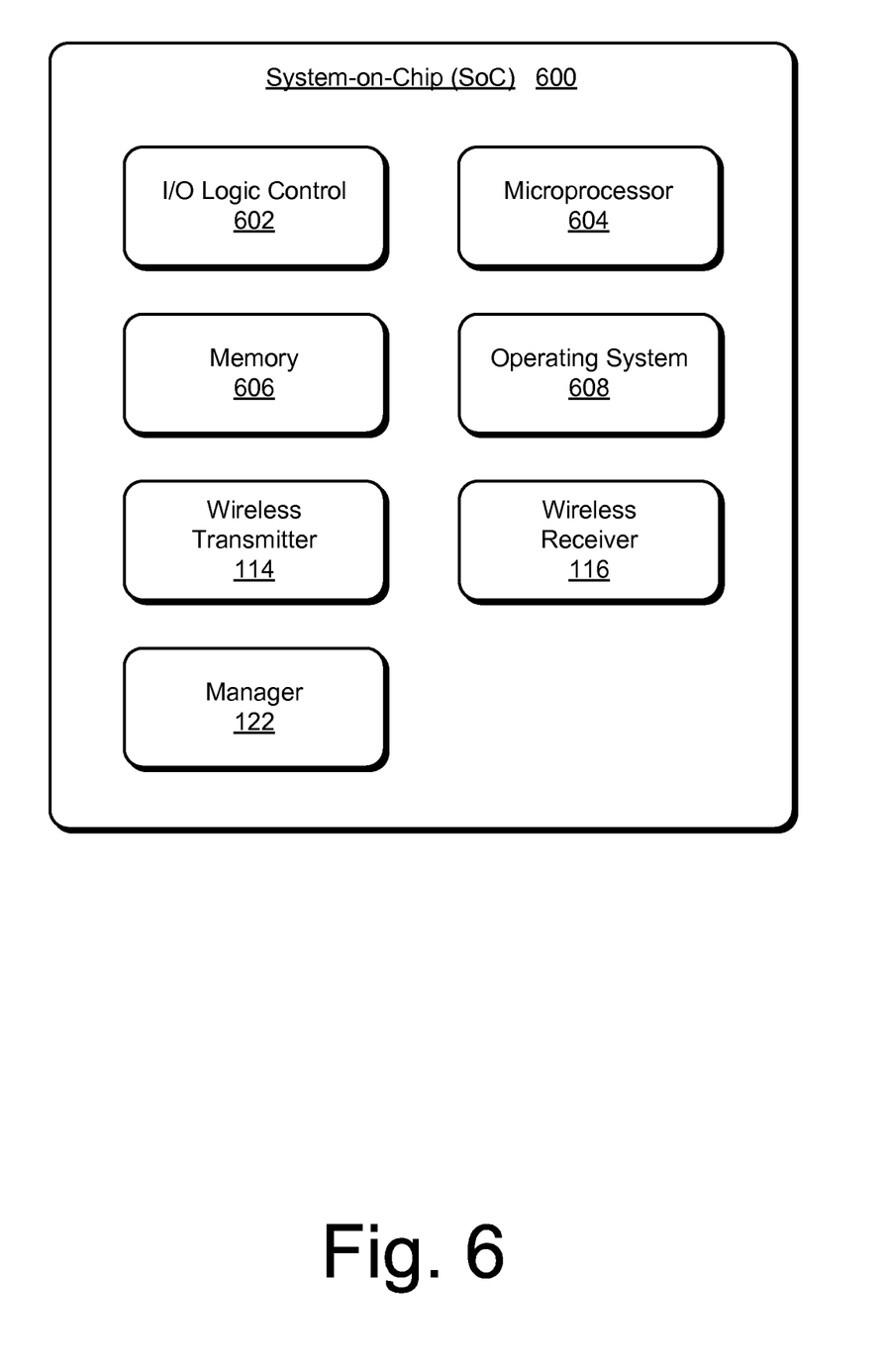
FIG. 6 illustrates a System-on-Chip (SoC) environment for implementing aspects of the techniques described herein.

FIG. 6 illustrates a System-on-Chip (SoC) 600, which can implement various embodiments described above. A SoC can be implemented in any suitable device, such as a video game console, IP enabled television, desktop computer, laptop computer, tablet computer, server, network-enabled printer, set-top box, printer, scanner, camera, picture frame, and/or any other type of device that may implement wireless connective technology.

SoC 600 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 600 can also include an integrated data bus (not shown) that couples the various components of the SoC for data communication between the components. A wireless communication device that includes SoC 600 can also be implemented with many combinations of differing components. In some cases, these differing components may be configured to implement concepts described herein over a wireless connection or interface.

In this example, SoC 600 includes various components such as an input-output (I/O) logic control 602 (e.g., to include electronic circuitry) and a microprocessor 604 (e.g., any of a microcontroller or digital signal processor). SoC 600 also includes a memory 606, which can be any type of RAM, low-latency nonvolatile memory (e.g., flash memory), ROM, and/or other suitable electronic data storage. SoC 600 can also include various firmware and/or software, such as an operating system 608, which can be computer-executable instructions maintained by memory 606 and executed by microprocessor 604. SoC 600 can also include other various communication interfaces and components, communication components, other hardware, firmware, and/or software.

SoC 600 includes wireless transmitter 114, wireless receiver 116 and manager 122 (embodied as disparate or combined components as noted above). Examples of these various components, functions, and/or entities, and their corresponding functionality, are described with reference to the respective components of the environment 100 shown in FIG. 1 and FIG. 2.

Manager 122, either independently or in combination with other entities, can be implemented as computer-executable instructions maintained by memory 606 and executed by microprocessor 604 to implement various embodiments and/or features described herein. Manager 122 may also be provided integral with other entities of the SoC, such as integrated with one or both of I/O logic controller 602 or any packet-based interface within SoC 600. Alternatively or additionally, manager 122 and the other components can be implemented as hardware, firmware, fixed logic circuitry, or any combination thereof that is implemented in connection with the I/O logic control 602 and/or other signal processing and control circuits of SoC 600.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
receiving, via a wireless interface, a frame from a wireless device, the frame including information useful to identify a name of a wireless network with which the wireless device is associated and a service provided by the wireless device, the information useful to identify the name of the wireless network and the service provided by the wireless device being included in a service set identifier (SSID) field of the frame, the service provided by the wireless device being a service other than access to the wireless network;
identifying the service provided by the wireless device based on the information in the SSID field of the frame and known service identification information; and
associating the identified service with the wireless device effective to enable use of the identified service via the wireless interface.

2. The method of claim 1, further comprising configuring the wireless interface to scan for frames broadcast by wireless devices.

3. The method of claim 1, wherein the wireless network is provided by the wireless device and the method further comprises initiating access of the identified service by causing the wireless interface to associate with the wireless network provided by the wireless device.

4. The method of claim 1, wherein the wireless interface is not associated with a wireless network provided by the wireless device during the acts of receiving, identifying, or associating.

5. The method of claim 1, wherein the wireless interface is a wireless local area network (WLAN) interface compliant with an IEEE 802.11 standard.

6. The method of claim 1, wherein the information useful to identify the name of the wireless network is included in a first portion of the SSID field and the information useful to identify the service is patterned or encoded within a second portion of the SSID field such that the second portion of the SSID field is useful to identify the service based on the known service identification information.

7. A method comprising:
broadcasting, from a wireless interface providing a wireless network, a frame including information identifying a name of the wireless network and a service that is accessible via the wireless network, the information identifying the name of the wireless network and the service being included in a service set identifier (SSID) field of the frame, the service accessible via the wireless network being a service other than network access;
receiving a request to associate with the wireless network from a wireless device capable of accessing the service; and
granting the request to associate with the wireless network effective to enable the wireless device to access the service over the wireless network.

8. The method of claim 7, further comprising configuring the wireless interface to provide the wireless network.

9. The method of claim 7, further comprising receiving data related to the service from the wireless device in response to enabling access to the service.

10. The method of claim 7, wherein the wireless interface is compliant with an IEEE 802.11 specification and is configured as an access point when providing the wireless network.

11. The method of claim 7, wherein the SSID field is useful to identify the name of the wireless network and a portion of the SSID is encoded with the information identifying the service such that the portion of the SSID is useful to identify the service accessible via the wireless network.

12. The method of claim 7, wherein the wireless device has information for identifying the service that is complementary to the information of the frame.

13. The method of claim 7, wherein the service accessible via the wireless network comprises one of a printing service, a scanning service, a data storage service, a streaming media service, or a media presentation service.

14. One or more computer-readable memory devices comprising computer-executable instructions that, responsive to execution, implement a wireless-service manager to:
receive a request for a service from an application;
configure, responsive to the request for the service, a wireless interface to receive beacons identifying services accessible via respective wireless networks, the services being services other than access to the respective wireless networks;
receive one or more of the beacons identifying services accessible via the respective wireless networks, each of the one or more beacons having a respective service set identifier (SSID) field that includes information useful to identify a name of a respective wireless network and a service available via the respective wireless networks;
determine, based on the one or more received beacons, which service accessible via the respective wireless networks corresponds with the request for the service; and
cause the wireless interface to associate with the wireless network through which the corresponding service is accessible to enable fulfillment of the request for the service.

15. The one or more computer-readable memory devices of claim 14, wherein the SSID fields of the beacons identifying the names and the services include portions of hexadecimal numbers that are encoded or patterned with the information useful to identify the services.

16. The one or more computer-readable memory devices of claim 14 comprising additional computer-executable instructions that, responsive to execution, further implement the wireless-service manager to present a list of corresponding services via a user interface and receive input from the user interface to select one of the corresponding services to access.

17. The one or more computer-readable memory devices of claim 14, wherein the determining is performed using a regular expression pattern matching algorithm.

18. The one or more computer-readable memory devices of claim 14, wherein the request for service includes one of a print request, scan request, data storage request, or media presentation request.

19. The one or more computer-readable memory devices of claim 14, wherein the services accessible via respective wireless networks include a printing service, a scanning service, a data storage service, a streaming media service, or a media presentation service.

20. The method of claim 1, wherein the service provided by the wireless device is one of a printing service, a scanning service, a data storage service, a streaming media service, or a media presentation service.

* * * * *